US009992645B2

(12) United States Patent
Zhakov

(10) Patent No.: US 9,992,645 B2
(45) Date of Patent: Jun. 5, 2018

(54) UNIVERSAL CONNECTION STATION

(75) Inventor: Vyacheslav Zhakov, Burlingame, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 915 days.

(21) Appl. No.: 13/243,464

(22) Filed: Sep. 23, 2011

(65) Prior Publication Data

US 2013/0077537 A1    Mar. 28, 2013

(51) Int. Cl.
| | | |
|---|---|---|
| H04L 5/20 | (2006.01) | |
| H04W 4/16 | (2009.01) | |
| H04M 1/725 | (2006.01) | |
| H04W 84/04 | (2009.01) | |
| H04W 84/12 | (2009.01) | |

(52) U.S. Cl.
CPC .......... *H04W 4/16* (2013.01); *H04M 1/7253* (2013.01); *H04M 1/72502* (2013.01); *H04M 2250/62* (2013.01); *H04W 84/042* (2013.01); *H04W 84/12* (2013.01)

(58) Field of Classification Search
CPC ..... H04W 4/16; H04W 84/12; H04W 84/042; H04M 1/7253; H04M 1/72502; H04M 2250/62
See application file for complete search history.

(56) References Cited

U.S. PATENT DOCUMENTS

| | | | |
|---|---|---|---|
| 6,549,790 B1 * | 4/2003 | Rubbmark et al. ........... 455/557 |
| 7,254,123 B2 * | 8/2007 | Jukarainen .................... 370/337 |
| 7,266,204 B2 * | 9/2007 | Watson et al. ................. 381/86 |
| 7,769,408 B2 * | 8/2010 | Hansson .................... 455/550.1 |
| 8,224,305 B2 * | 7/2012 | Gupta .......................... 455/416 |
| 8,560,023 B2 * | 10/2013 | Luzzatto .................... 455/569.1 |
| 2002/0119800 A1 | 8/2002 | Jaggers et al. |
| 2003/0044654 A1 * | 3/2003 | Holt ....................... H04M 3/56 455/416 |

(Continued)

OTHER PUBLICATIONS

International Search Report and the Written Opinion of the International Searching Authority, or Declaration, dated Nov. 29, 2012, for International Application No. PCT/US 12/56324, 6 pages.

*Primary Examiner* — Phuc Tran
(74) *Attorney, Agent, or Firm* — Lewis Roca Rothgerber Christie LLP

(57) ABSTRACT

An intelligent connection station has at least one wireless transceiver operating in a wireless protocol, at least one speaker and one microphone, a connection to a wide area network, and software executing on the connection station from a non-transitory physical medium, the software providing a first function seeking compatible communication appliances within range of the wireless transceiver operating in the wireless protocol, and a second function enabling wireless pairing, providing a wireless link between the intelligent connection station and any communication appliance discovered within range and activated to pair. The pairing enables digital communication between the paired device and a remote communication appliance over the wireless link, through the intelligent connection station and the wide area network.

15 Claims, 4 Drawing Sheets

(56) References Cited

U.S. PATENT DOCUMENTS

| | | | |
|---|---|---|---|
| 2003/0157929 A1* | 8/2003 | Janssen | H04M 3/56 455/416 |
| 2005/0239479 A1* | 10/2005 | Bednasz | 455/456.1 |
| 2007/0021148 A1 | 1/2007 | Mahini | |
| 2007/0117556 A1* | 5/2007 | Rogalski | 455/416 |
| 2009/0081999 A1* | 3/2009 | Khasawneh et al. | 455/416 |
| 2010/0198989 A1* | 8/2010 | Jia et al. | 709/245 |
| 2012/0314705 A1* | 12/2012 | Howard | 370/390 |
| 2013/0059625 A1* | 3/2013 | Clegg et al. | 455/552.1 |

* cited by examiner

UNIVERSAL CONNECTION STATION

BACKGROUND OF THE INVENTION

1. Field of the Invention

The present invention is in the field of telephony and pertains particularly to a universal connection station that provides functions of a connection station, and many additional functions.

2. Discussion of the State of the Art

In the field of telephony, mobile communications technology has emerged as the main frontier of continued development. In enterprise applications, communications appliances like video-enabled phones are available for conducting meetings, conferences, and so on. Current state-of-art video phones or meeting hubs comprise proprietary front-ends having static features such as displays, cameras, function buttons, dial pads, and so on. In order to operate successfully, users must utilize the provided handsets that are specifically designed to fit into appropriate connection station or communications hub hardware.

More recently, companies have introduced connection stations that enable smart mobile communications devices (SMCD), termed communications appliances in this specification, which may be physically plugged into the supporting connection station or communications hub hardware. However, such connection stations are largely monolithic in terms of features, providing only supportive functions like charging and loudspeakers for speakerphone operation, while the mobile communications appliance is docked. These connection stations lack any standalone telephony capabilities. Moreover, these stations become inactive when the mobile communications appliance is unplugged or disconnected from the station, or if the appliance is plugged in but powered off.

In enterprise group communications more flexibility is desired with respect to the ability to participate in group telephony collaboration and discussion. Therefore, what is clearly needed is a universal connection station enabled for telephony that solves the monolithic nature of current enterprise systems. A system such as this would enable more flexibility and require less training than current systems.

SUMMARY OF THE INVENTION

The problem stated above is that universatility is desirable for a communications appliance connection station, but many of the conventional means for connection communications appliances, such as connection stations, also create limitations in flexibility in telephony communications. The inventors therefore considered functional elements of a connection station and a communication system, looking for elements that exhibit interoperability that could potentially be harnessed to provide full-feature telecommunications, but in a manner that would not create limitations in the flexibility of such communication capabilities.

Every telephone system is graded by flexibility in features, one by-product of which is an abundance of usable features that provide more efficient communication. Most such telephone systems employ a base station to coordinate telephone features and connected handsets and connection interfaces and telephony software and firmware features are typically a part of such apparatus.

The present inventor realized in an inventive moment that if, at the point of initiation of a telephony session, a connection station could be used to accept a voice call, wherein the established voice session may be continued on a variety of mobile communications appliance disconnected from the connection station, significant feature enhancement to the established voice session might result. The inventor therefore constructed a unique system for maintaining a telephony session with a communications appliance that allowed users to connect to the session using one of a variety of available mobile communications appliances, but constrained, via software, enhanced telephony features to the dockable appliances. A significant enhancement is telephony session feature sets results, with no impediment to the session connection process created.

Accordingly, in an embodiment of the present invention, an intelligent connection station is provided, comprising at least one wireless transceiver operating in a wireless protocol, at least one speaker and one microphone, a connection to a wide area network, and software executing on the connection station from a non-transitory physical medium, the software providing a first function seeking compatible communication appliances within range of the wireless transceiver operating in the wireless protocol, and a second function enabling wireless pairing, providing a wireless link between the intelligent connection station and any communication appliance discovered within range and activated to pair. The pairing enables digital communication between the paired device and a remote communication appliance over the wireless link, through the intelligent connection station and the wide area network.

Also in one embodiment a security protocol is followed in pairing. Also in an embodiment multiple communication devices are paired with the intelligent connection station, providing for conference communication. In some embodiments multiple pairings are maintained with individual pairings active and others in a sleep mode.

In some embodiments the connection to a wide area network is accomplished through a local area network. Also in some embodiments the communication appliances comprise one or more of an iPad, an Android device, a cellular telephone, a laptop, and a personal computer enabled for communication. The wireless protocol may be one of Bluetooth™, Near Field Communications (NFC), Wireless Fidelity (WiFi), or Worldwide Interoperability for Microwave Access (WiMAX).

In some embodiments the digital communication is accomplished through a Global System for Mobile Communications (GSM) link or a Code Division Multiple Access (CDMA) link. In some cases there may be a Femtocell for boosting signal strength. Also in some cases there may be connection to a session initiation protocol (SIP) server integrated with a telephony voice or voice/video platform. There may also be a battery-charging interface including one or both of a plug-in charge port and an inductive charging sub-system.

In another aspect of the system a method for providing communication for communication appliances is provided, comprising the steps of (a) connecting an intelligent connection station to a wide area network; (b) seeking compatible communication appliances within range of a wireless transceiver operating in a wireless protocol in the intelligent connection station; and (c) providing a wireless link between the intelligent connection station and any communication appliance discovered within range and activated to pair. Pairing enables digital communication between the paired device and a remote communication appliance over the wireless link, through the intelligent connection station and the wide area network.

In one embodiment of the method a security protocol is followed in pairing in step (c). Also in one embodiment multiple communication devices are paired in step (c) with the intelligent connection station, providing for conference communication. In some instances multiple pairings are maintained with individual pairings active and others in a sleep mode.

In some embodiments the connection to a wide area network in step (a) is accomplished through a local area network. The communication appliances may comprise one or more of an iPad, an Android device, a cellular telephone, a laptop, and a personal computer enabled for communication. Further, the wireless protocol may be one of Bluetooth™, Near Field Communications (NFC), Wireless Fidelity (WiFi), or Worldwide Interoperability for Microwave Access (WiMAX). In some cases the digital communication is accomplished through a Global System for Mobile Communications (GSM) link or a Code Division Multiple Access (CDMA) link. Also in some cases there may be a Femtocell for boosting signal strength.

In some embodiments connection to a session initiation protocol (SIP) server integrated with a telephony voice or voice/video platform is provided. There may also be a step for charging batteries of paired appliances through a battery-charging interface including one or both of a plug-in charge port and an inductive charging sub-system.

BRIEF DESCRIPTION OF THE DRAWING FIGURES

DETAILED DESCRIPTION

The present inventors provide a unique intelligent connection station (ICS) and communication system that enables single and group wireless connectivity to and through the station to a wide variety of communications appliances adapted for wireless communications. The term "docking" is typically regarded as making a physical connection, such that a connector of the communication appliance is joined with a connector of the docking station. In context of embodiments of this invention the functionality of connection is accomplished, but the "connection" is typically wireless, not physical. So the inventors use the term "connection" station, rather than "docking" station. The present invention is described in enabling detail using the following examples, which may describe more than one relevant embodiment falling within the scope of the present invention.

Figure 1:
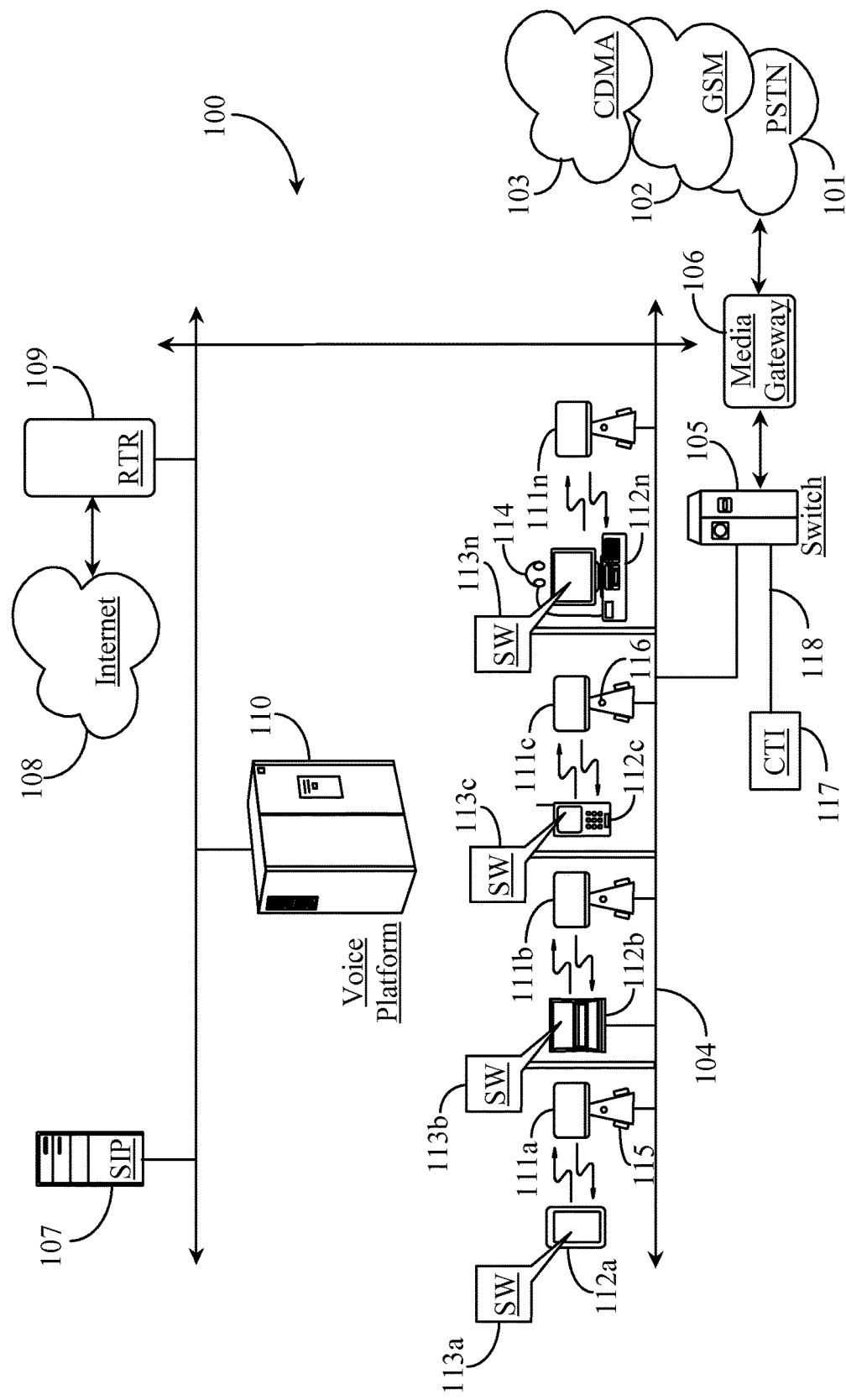
FIG. 1 is an architectural view of a communications network supporting a universal connection station and system for communication according to an embodiment of the present invention.

FIG. 1 is an architectural view of a communications network 100 supporting an intelligent connection station and system for communication according to an embodiment of the present invention. Communications network 100 includes the well-known Internet network 108 and several wired and wireless telephony carrier networks including a public-switched-telephone-network (PSTN) 101, a Global System for Mobile Access (GSM) network 102, and a Code-Division Multiple Access (CMDA) network.

In this example, an enterprise is represented by a local area network (LAN) 104. LAN 104 supports several intelligent connection stations (ICS) 111(*a-n*). Connection stations 111(*a-n*) in one embodiment are directly connected to LAN 104 and are enabled for communication, such as telephony communication, as standalone devices. In this embodiment, connection stations 111(*a-n*) each have at least one speaker 115 (two illustrated), and at least one microphone 116 (one illustrated) for bi-directional voice telephony. Each connection station 111(*a-n*) is logically separated on LAN 104 for the purpose of representing separate "work stations" each enabled for communication utilizing one ICS.

Each connection station 111(*a-n*) is adapted to pair with a variety of smart mobile communications devices (SMCDs) also termed communications appliances in this specification. Communications devices 112(*a-n*) may include any digital computing appliance that is adapted for digital communication, such as telephony. In this embodiment, appliance 112(*a*) is an iPad-type appliance. Communications appliance 112(*b*) is a notebook computer or laptop computer. Communications appliance 112(*c*) is a cellular telephone. Communications appliance 112(*n*) is a personal computer (PC) adapted for voice communications using a headset 114. Communications appliances other than those illustrated may also be used in conjunction with connection stations 111(*a-n*) such as an Android device or a Personal Digital Assistant (PDA).

In this example connection stations 111(*a-n*) are each wirelessly paired to their associated communications appliances 112(*a-n*). The wireless connection may be one of a Bluetooth™, wireless Universal Serial Bus (USB), Wireless Fidelity Network (WiFi), or other suitable wireless data communications methods. Each connection station 111(*a-n*) pairs wirelessly with any communications appliance adapted with the same wireless protocol when the device is brought into range with a pairing/peering feature activated. There is, in many embodiments, flexibility to pair a given communications appliance with any pairing-enabled communication station. However, at a given time, typically only one pairing may be active. In some embodiments multiple pairings are established, but only one is active and the others are in sleeping mode with only basic status indication, such as whether the communication is still ongoing, who is attending etc. In this case a user might switch dynamically from one pairing to another. The pairing may be security protected to prevent secret attendance/eavesdropping.

When a communication event, such as a voice call, is received at the connection station it may be answered at the connection station in standalone application. At least a bi-directional voice interaction may be conducted using the ICS 111 alone without any other appliances. In one embodiment, the event may be extended over a wireless channel to a paired communications appliance that is within wireless range of the connection station and has wireless capability enabled. This is achieved using software (SW) 113 (*a-n*). SW 113(*a-n*) represents a front-end client application that is downloaded to and installed on mobile communications appliances 112(*a-n*). The client application may be tailored or customized according to the platforms and capabilities featured on each mobile appliance. Application 113(*a-n*) includes software required to pair and bind wirelessly to the connection station and software required to enable connectivity between a session initiation protocol (SIP) server 107 supported by LAN 104 over the wireless connections forged at the connection stations between the stations and mobile appliances.

Connection stations 111(*a-n*) may be equipped with an appliance charging feature (not illustrated) whereby a charging port and a set of adapters may be utilized at the connection station to dock and charge more than one type of communications appliance. In one embodiment, the connection station includes an electromagnetic charging pad or other sort of inductive charging in lieu of or in addition to a physical charging port. In this way, support is provided for a wide variety of popular communications appliances and proprietary brands having specific charge plug configurations.

Each connection station 111(*a-n*) has an Ethernet port in this example and is directly connected to LAN 104 for receiving events from external networks and placing communication events to destination parties through external networks. As such, network peering may be practiced to regulate call flow for the mutual benefit of the participating networks. It should be noted herein that an ICS such as one of stations 111(*a-n*) does not require connection to a LAN in order to practice the present invention. Connection stations 111(*a-n*) may instead be connected to internal telephone cabling, directly to an Internet network, or to some other network supporting bi-directional digital communications. In another embodiment the ICS may also comprise a simple display or touch-enabled display, and may be enabled for call management, including video calls.

LAN 104 in this example supports a telephone switch 105. Telephone switch 105 may be an automated call distributor (ACD), or a Private Branch Exchange (PBX) without departing from the spirit and scope of the present invention. Switch 105 is enhanced for intelligent routing by a computer telephony integrated (CTI) processor 117. CTI processor 117 is connected to switch 105 by a CTI link 118. Switch 105 receives calls from external networks by virtue of connection to a media gateway 106. Gateway 106 provides seamless negotiation for successful transmission of data and media incoming from external networks or outgoing onto external networks. Gateway 106 has connection to PSTN 101, GSM 102, and CDMA 103 in this example.

Ethernet LAN 104 in one embodiment supports a telephony voice platform 110. Voice platform 110 is adapted to support voice and video telephony communications over LAN 104. Voice platform 110 is known to and available to the inventors for supporting digital voice and video communications over LAN 105. As described further above, LAN 105 also supports a session initiation protocol (SIP) server 107. SIP server 107 includes a non-transitory physical medium containing thereon all of the data and software required to enable SIP service for establishing and terminating SIP-based communication, such as voice and video calls. In this example, SIP is used to establish voice and video sessions between callers and agents operating mobile appliances 112 (*a-n*) connected wirelessly to connection stations 111(*a-n*) respectively. However, in other embodiments, another protocol may be used to establish the session legs required to create a voice/video call.

LAN 104 supports an Internet protocol router 109. Router 109 is adapted to route data incoming from Internet network 108. Internet network 108 includes all of the lines equipment, and access points that make up the Internet as a whole. Therefore, there are no geographic limitations to the practice of the present invention. Other servers may be present, although not illustrated on LAN 104, such as a Chat server and a Presence server without departing from the spirit and scope of the present invention. Moreover, an interactive voice response (IVR) unit may also be present for screening calls and directing routing based on call details and caller intent.

In use of the present invention in this example, each connection station 111(*a-n*) has a LAN address and is adapted to handle bi-directional voice telephony as a stand-alone unit, and in some embodiments also to handle bi-directional video sessions as a stand-alone unit. For example, if a call is routed from switch 105 to connection station 111(*a*), the call could be answered using just the connection station without a mobile communications appliance connected to the station. In one embodiment a communications appliance like iPad 112(*a*) is docked to station 111(*a*), but is powered off. In this case, the features on the connection station may be relied upon to handle incoming or outgoing voice calls. In another embodiment, iPad 112(*a*) may be powered on and paired wirelessly with connection station 111(*a*). In this case, a connected call relies on the features of the iPad for voice/video communications and the features on the connection station may be powered off, at least during the call. The call may be continued on the mobile communications appliance until the call is terminated. The same functionality described above is also in operation when the call comes in from the Internet via router 109.

In one embodiment of the invention, a connection station like station 111(*a*) may support several mobile communications appliances simultaneously that are paired wirelessly with station 111(*a*). In this embodiment, connection station 111(*a*) functions as a conference hub enabling multiple users to participate wirelessly on their personal mobile appliances as long as they are within pairing range of the connection station. In another embodiment, users may plug in one or more mobile appliances using an appropriate adapter to enable appliance charging and to enable continued session functionality on the tethered devices as long as they are powered on when tethered to the station. In another embodiment, wireless connectivity using Bluetooth™ or another wireless networking protocol is practiced between the connection station and one or more mobile communications appliances to enable full feature session control from the mobile appliance or appliances in use during a session. Wireless coverage may be short range, medium range or long range depending upon the wireless protocol used, and customer premise configuration.

In one embodiment each station may support one or more separate telephony sessions, which may be two party, three party, or conference calls where multiple parties participate. In one embodiment, a user operating a communications appliance like iPad 112(*a*) in an established session continued wirelessly from the connection station to the appliance may step out of range of the wireless coverage and take a side call on their own personal number. When they want to re-enter the ongoing session, they may terminate the side call and step back into wireless range whereupon the ongoing session is automatically re-connected to their appliance via the re-established wireless connection.

Incoming calls in this example through switch 105 or through router 109 may be routed to any one of connection stations 111(*a-n*) depending on availability of agents. Call types include voice calls, voice/video calls, and graphics data presentations using applications like Go-to-Meeting collaboration software, My Teamwork (known to the inventor) and other similar collaborative applications. In addition to Chat service, messaging applications like short message service (SMS), email, and instant messaging (IM) may also be supported over the wireless connection between a connection station and mobile communications appliances. In one embodiment, ICS 111 may have an adjustable connection head that can be physically adjusted for presenting a docked mobile communications appliance at an optimum angle of presentation for specific users.

Figure 2:
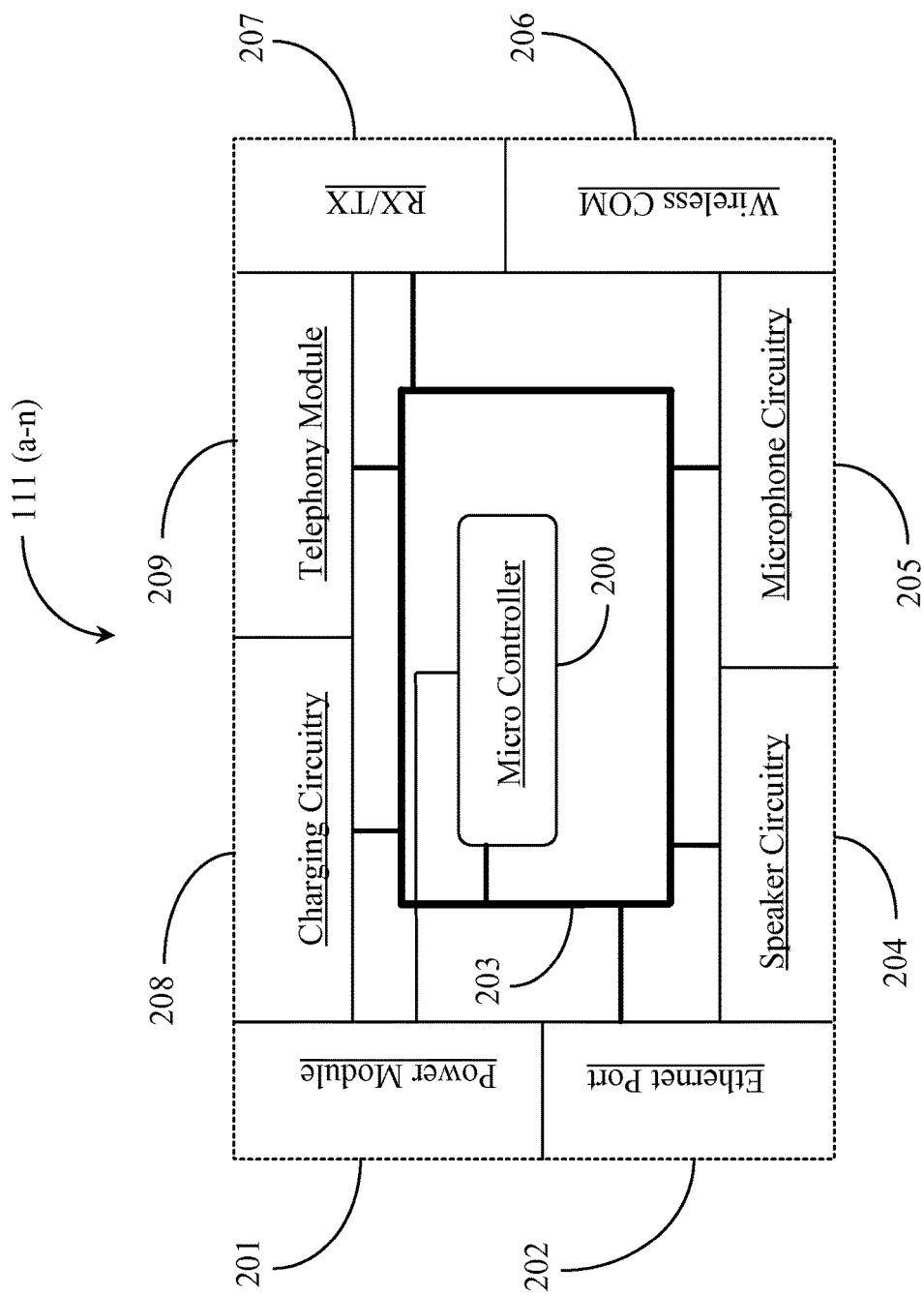
FIG. 2 is a block diagram illustrating basic components of a universal connection station of FIG. 1.

FIG. 2 is a block diagram illustrating basic components of a universal connection station 111(*a-n*) of FIG. 1 in one embodiment. Station 111 includes a micro controller 200 connected to a power module 201 via a power line or trace. Power module 201 may be an AC/DC plug that is connected to a power source such as an electrical outlet. In one embodiment, power module 201 includes a back-up battery function for continued operation in the event of loss of power. Connection station 111 in one embodiment includes an Ethernet port 202 enabling direct LAN connection.

Connection station 111 includes charging circuitry 208. Charging circuitry 208 may consist of a charging plug with several different adapters for use with differing mobile communications appliances. Charging circuitry 208 may also include an electromagnetic charging pad or other inductive device. In a one embodiment, connection station 111 includes speaker circuitry 204 for supporting at least one analog loudspeaker, and microphone circuitry 205 for supporting at least one microphone. Speaker and microphone components may be provided through a headset in some embodiments.

Connection station 111 includes at least one wireless communications module 206. Wireless communications module 206 contains all of the circuitry required to enable short-range, medium-range, or long-range wireless communications between the station and a mobile communications appliance adapted with suitable wireless communications capabilities. Connection station 111 includes a transceiver (RX/TX) 207 enabling bi-directional wireless or radio communications. Connection station 111 includes a telephony module 209 that contains all of the circuitry required to enable full-duplex bi-directional audio telephony. Connection station 111 includes a logical BUS structure 203 connected to micro-controller 200. Logical BUS structure 203 provides the communication and power to all of the components of the connection station.

In one embodiment, connection station 111 includes additional and optional features like a dial pad, video display, and a camera, however these features are not required to practice the present invention. In a preferred embodiment, full feature telephony is controlled at each mobile communications appliance and feature extent depends on the features loaded on each appliance. In one embodiment, connection station 111 includes a Femtocell for boosting local GSM or CDMA signals.

Optionally, a mobile communications appliance may be physically connected to a connection station via an appropriate hardwired connection. Wireless connectivity between the connection station and a mobile communications appliance may be short-range using near field communications (NFC) or Bluetooth™. Wireless connectivity between the connection station and a mobile communications appliance may be medium-range to long-range using Intel's Wireless Display (WiDi), GSM, Universal Mobile Telecommunications System (UTMS), Long Term Evolution (LTE) and Worldwide interoperability for Microwave Access (WiMax).

In one embodiment, a mobile communications appliance paired wirelessly with a connection station may be switched off during a session while the session remains active at the connection station. Using full features and control of switching certain features on and off depends in part of the connection mode and feature controls on the mobile communications appliance. In one embodiment, a conference may be established whereby the connection station and a paired mobile communications appliance may recognize the virtual presence of a remote conference attendee. In a preferred embodiment, the system supports personal office communication utilizing the capabilities of the connection station and the paired mobile communications appliance in conjunction. In one embodiment, connection station 111 is equipped with logic and components for supporting voice-controlled connection management.

Figure 3:
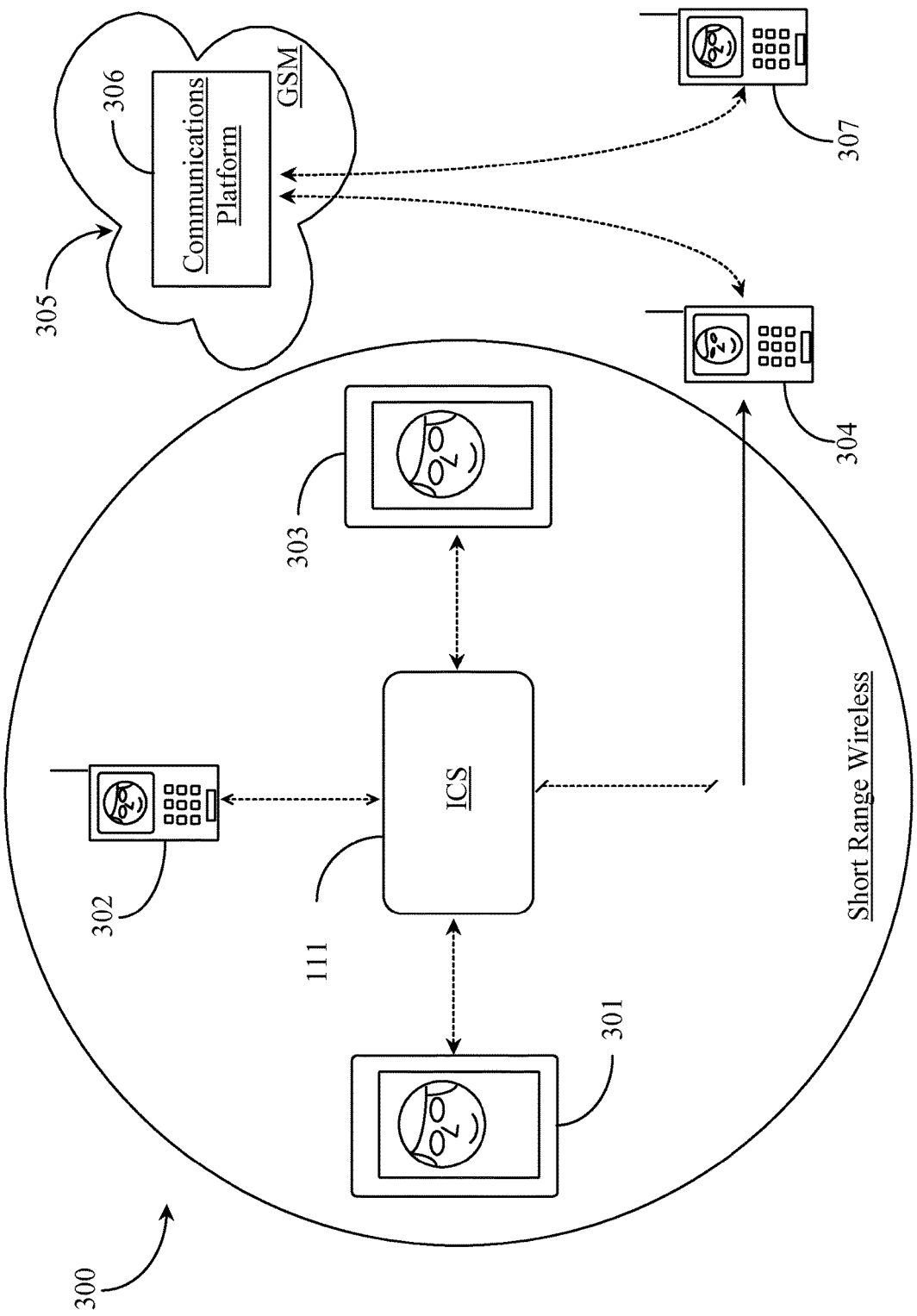
FIG. 3 is a block diagram illustrating wireless connectivity between the universal connection station of FIG. 1 and various communications appliances according to an embodiment of the present invention.

FIG. 3 is a block diagram 300 illustrating wireless connectivity between the universal connection station of FIG. 1 and various communications appliances according to an embodiment of the present invention. Diagram 300 includes an intelligent connection station (ICS) 111. A variety of mobile communications appliances analogous to appliances 112(*a-n*) are illustrated in state of wireless connection with ICS 111 and engaged in a conference call. These are an iPad 301, a smart phone 302, and another iPad 303. Broken double arrows shown connecting each appliance to the connection station illustrate active wireless session connectivity.

In this example, a short-range wireless protocol is used and appliances 301-303 are within range of ICS 111 and considered engaged in session. Another smart phone 304 was previously engaged in session as illustrated by the broken connection line. At some point the user operating appliance 304 has stepped out of range of ICS 111. A directional arrow leading out of range of ICS 111 illustrates this fact. In this use case, Mobile appliance 304 is temporarily disconnected from the conference call because the operator stepped out of range of the wireless communication boundary of the ICS.

In this mode, the operator of appliance 304 accepts a side audio/video call from the conference leader operating a smart phone 307. This call could be a full volume call or a call conducted in whisper mode so as not to disturb other conference participants. In this case, a telephony platform 306 within a GSM network 305 facilitates the side-call. Once the operator of communications appliance 304 is finished with the side-conversation, he or she may step back into wireless range of ICS 111 and the ongoing conference session is automatically re-established between ICS 111 and appliance 304 via the ICS wireless protocol.

In a typical scenario, if a mobile communications appliance analogous to appliance 301 is physically plugged into ICS 111, then the standard functions of ICS 111 are provided. Functions that exist in both ICS 111 and appliance 301 (loudspeaker, microphone) are activated only once, preferably on ICS 111. If mobile appliance 301 is paired with ICS 111 but not physically connected, then the ICS communication functions may remain activated. In this case, specific functions generic to mobile appliance 301 can be manually activated and controlled. As described further above, it is also possible to conduct a side conversation from a wirelessly paired mobile appliance with a remote participant wherein such side conversation is not exposed at ICS 111. This feature enables a use case where a communication (conference) participant could take a mobile appliance such as appliance 301 to another location and have a confidential conversation while the conference is still ongoing. Moreover, this feature can be implemented using whisper coaching, a feature enabled in some contact center system deployments.

In a preferred embodiment, communication at a mobile appliance like appliance 301 can be stopped or switched off while it is still active at ICS 111. Communication extension to the mobile appliance can later be resumed by powering the appliance back on while within wireless range of the ICS. In one aspect, communication can be fully transferred from ICS 111 to mobile communications appliance 301 with audio stopped at the ICS for confidentiality purposes. In one aspect, a communications session established through ICS 111 and extended wirelessly to communications appliance 301 can be terminated from either the ICS or the connected appliance. In the case of WiFi, a WiFi router may be required if the capability is not built into the ICS. In one aspect, a wirelessly-paired mobile appliance such as appliance 301 can be physically plugged into ICS 111. This action may cause the system to switch to basic mode where additional features of the communications appliance are switched off or disabled. Several such communications appliances can be paired with ICS 111 and may be controlled independantly with respect to feature enablement in the same way as described above.

Figure 4:
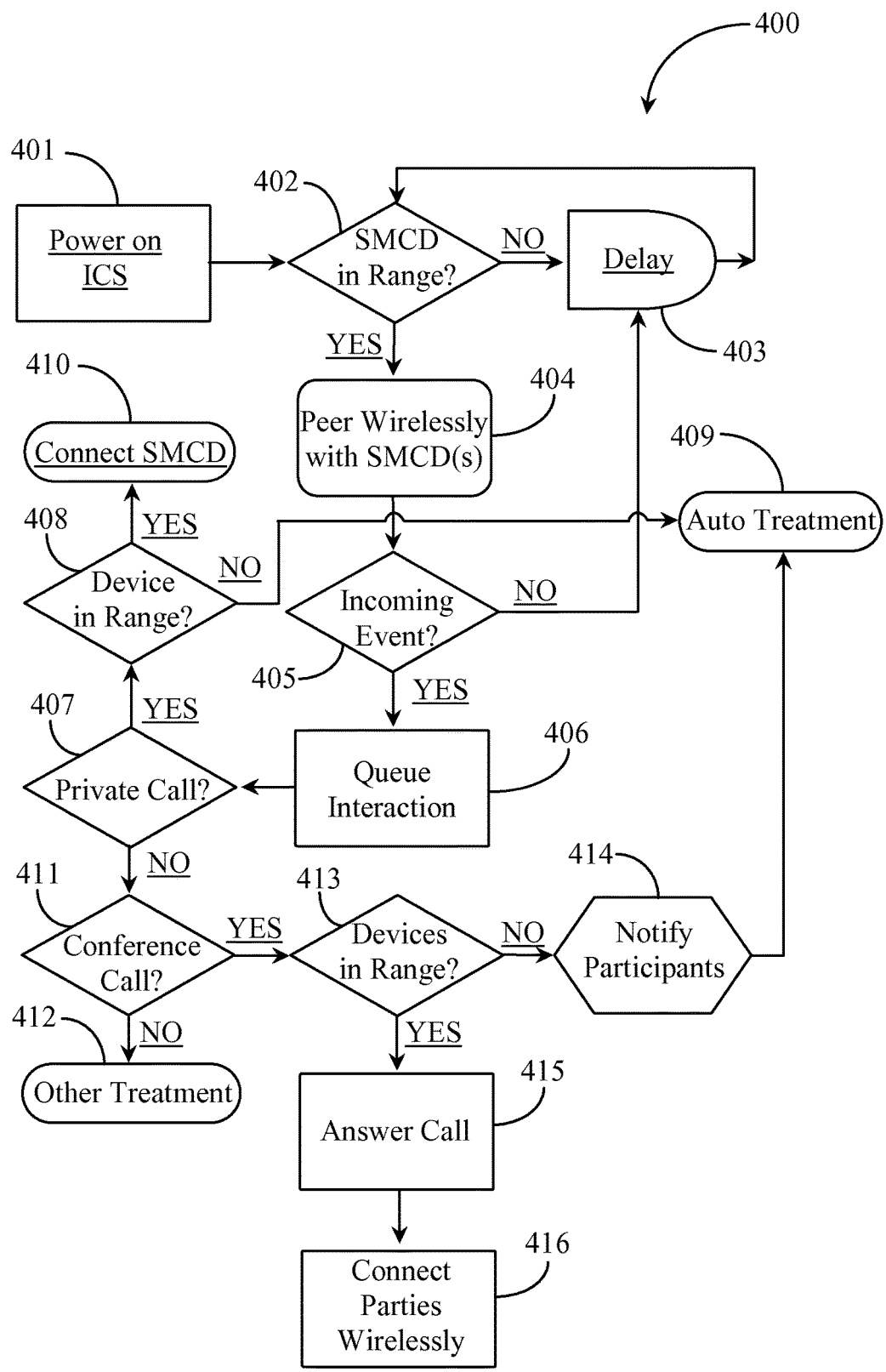
FIG. 4 is a process flow chart illustrating steps for establishing communications between a caller and destination parties using the universal connection station of FIG. 1.

FIG. 4 is a process flow chart 400 illustrating steps for establishing communications between a caller and destination parties using the intelligent connection station of FIG. 1. At step 401, an intelligent connection station such as ICS 111 is powered on. At step 402, the ICS determines if a mobile communications appliance, also referred to as a smart mobile communications device (SMCD) is within range of the ICS. If at step 402, no appliance is in range, the process skips to step 403 for a small delay and resolves back to periodic checking for devices in range.

If the ICS determines that a SMCD is within wireless communications range at step 402, then at step 404 the ICS pairs wirelessly to the detected SMCD, if connectivity is enabled at the device. In this step several SMCDs may be detected and paired, for example, ahead of a scheduled conference call. In a personal use case, only one device might be paired ahead of incoming calls. At step 405, the ICS determines if there is an incoming event routed to the ICS. If there are no incoming events at the connection station, the process may resolve back to step 403 for a short delay followed by SMCD detection at step 402. The ICS periodically or continually checks for new mobile devices and pairs with those that are detected in wireless range and activated to pair. In one embodiment, SMCDs must be authorized to pair with a specific ICS station for security purposes. For example, during a conference call set-up, automated authorization may be performed during discovery of new devices. Those devices that do not have authority are not paired wirelessly when in range of the ICS.

If there is an incoming event detected by the ICS at step 405, then the event may be queued at step 406 for a particular qualified agent. At step 407, telephony screening such as with an IVR unit, may be used to determine the nature of the incoming call. If the call is a private call at step 407, the ICS may again check if a qualified agent is not busy and is within range of the ICS. At step 408, if a SMCD of an available, qualified agent is not in range, the call may remain in queue waiting for an agent, or the process may resolve to step 409 for automated treatment. If a qualified and available agent has a SMCD paired with the ICS, then the call is extended from the ICS to the SMCD over the wireless connection between the components at step 410. At this point the session is active and the full features of the SMCD are in play.

If it is determined at step 407 that the event is not a private call seeking a single destination, the system determines if the event is for a conference call at step 411. If the system determines that the event is not a conference call at step 411, the process moves to step 412 for some other planned treatment. If at step 411, it is determined that the incoming event is a scheduled conference call, then the ICS determines if all of the destination appliances (SMCDs) are in range to join the conference at step 413. If the ICS determines that not all of the destination devices are within wireless range of the ICS, the process may move to step 414 where the system notifies the missing conference participants via another channel. The process may resolve to step 409 for automated treatment depending on the required rules for holding and for attending a conference. In one embodiment if a sufficient number of destination SMCDs are detected within range of the ICS, then the conference may start if rule permits.

At step 413, if it is determined that the conference participants are physically or virtually present, the conference call is initiated at step 415. This may be performed by a conference leader or by any attendee if permitted. At step 416, the system connects the parties wirelessly to the conference in session. Conference participants may access all of the appropriate features on their SMCDs required to participate in the conference. In one embodiment of the present invention, one ICS may be equipped to hold more than one conference simultaneously. In this aspect, a conference leader may transfer the conference function to his or her SMCD over the wireless connection whereby the other participants follow the new conference leader whose device now functions as the conference hub.

It will be apparent to one with skill in the art that the universal intelligent connection station and system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. An intelligent connection station, comprising:
a charging port for charging a particular communication appliance upon coupling the particular communication appliance to the charging port;
a communications port for transmitting messages over a communications channel;
a wireless transceiver operating in a wireless protocol;
a speaker;
a microphone;
a processor; and
a memory, wherein the memory stores instructions that, when executed by the processor, cause the processor to:
establish telephony session with a first communication appliance over a communications network;
determine that the telephony session is to be routed to a contact center agent;
identify an agent qualified and available to handle the telephony session;
determine, in response to identifying the agent, whether a second communication appliance accessible to the agent is within range of the wireless transceiver operating in the wireless protocol;
in response to determining that the second communication appliance is within range, establish wireless communication with the identified second communication appliance and extend the telephony session to the second communication appliance;

determine whether a conference call should be held with a third communication appliance;

determine whether the third communication appliance is within range of the wireless transceiver operating in the wireless protocol;

in response to determining that the third communication appliance is within range, establish wireless communication with the identified third communication appliance and establish a conference call with the first, second, and third communication appliances; and in response to determining that the third communication appliance is outside of the range, transmit a notification to the third communication appliance over the communication channel.

2. The intelligent connection station of claim 1, wherein the second communication appliance is a mobile telephony device.

3. The intelligent connection station of claim 1, wherein the wireless protocol is a least one of a short-range wireless protocol, medium-range wireless protocol, or long-range wireless protocol.

4. The intelligent connection station of claim 1, wherein the charging port is a battery-charging interface configured to receive the second communication appliance for charging the second communication appliance.

5. The intelligent connection station of claim 1, wherein the telephony session is a voice-over-IP call.

6. The intelligent connection station of claim 1, wherein the communication network is a telephony carrier network.

7. The intelligent connection station of claim 1, wherein the communication network is the Internet.

8. The intelligent connection station of claim 1, wherein the memory further stores instructions that cause the processor to:

transfer the telephony session to the second communication appliance, wherein in response to the transfer, the second communication appliance functions as a conference hub and frees the intelligent connections station to conduct a second conference call concurrently with the conference call.

9. A method for providing communication for communication appliances, the method comprising:

establishing a telephony session between an intelligent connection station and a first communication appliance over a communications network, wherein the intelligent connection station includes a charging port for charging a particular communication appliance upon coupling the particular communication appliance to the charging port, a communications port for transmitting messages over a communications channel, and a wireless transceiver operating in a wireless protocol;

determining, by the intelligent connection station, that the telephony session is to be routed to a contact center agent;

identifying, by the intelligent connection station, an agent qualified and available to handle the telephony session;

determining, by the intelligent connection station, in response to identifying the agent, whether a second communication appliance accessible to the agent is within range of the wireless transceiver operating in a wireless protocol;

in response to determining that the second communication appliance is within range, establishing wireless communication between the intelligent connection station and the identified second communication appliance and extending the telephony session to the second communication appliance;

determining, by the intelligent connection station, whether a conference call should be held with a third communication appliance;

determining, by the intelligent connection station, whether the third communication appliance is within range of the wireless transceiver operating in the wireless protocol;

in response to determining that the third communication appliance is within range, establishing wireless communication between the intelligent connection station and the identified third communication appliance and establishing a conference call with the first, second, and third communication appliances; and in response to determining that the third communication appliance is outside of the range, transmitting, by the intelligent connection station, a notification to the third communication appliance over the communication channel.

10. The method of claim 9, wherein the second communication appliance is a mobile telephony device.

11. The method of claim 9, wherein the wireless protocol is a least one of a short-range wireless protocol, medium-range wireless protocol, or long-range wireless protocol.

12. The method of claim 9, wherein the charging port is a battery-charging interface configured to receive the second communication appliance for charging the second communication appliance.

13. The method of claim 9, wherein the telephony session is a voice-over-IP call.

14. The method of claim 9, wherein the communication network is a telephony carrier network.

15. The method of claim 9, wherein the communication network is the Internet.

* * * * *